US009401922B1

(12) United States Patent
Walters

(10) Patent No.: US 9,401,922 B1
(45) Date of Patent: Jul. 26, 2016

(54) SYSTEMS AND METHODS FOR ANALYSIS OF ABNORMAL CONDITIONS IN COMPUTING MACHINES

(75) Inventor: Aaron Walters, Reston, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 765 days.

(21) Appl. No.: 13/315,985

(22) Filed: Dec. 9, 2011

Related U.S. Application Data

(60) Provisional application No. 61/422,033, filed on Dec. 10, 2010.

(51) Int. Cl.
*G06F 15/167* (2006.01)
*H04L 29/06* (2006.01)

(52) U.S. Cl.
CPC ........................................ *H04L 63/14* (2013.01)

(58) Field of Classification Search
CPC ........................................................ H04L 63/14
USPC .................................... 709/213, 224; 726/14
See application file for complete search history.

(56) References Cited

U.S. PATENT DOCUMENTS

2009/0044265 A1\* 2/2009 Ghosh et al. .................... 726/14

\* cited by examiner

*Primary Examiner* — Glenford Madamba

(57) ABSTRACT

Systems and methods are provided for detecting an anomalous condition in a virtual computing environment having a virtualization control system coupled to a physical server, disk drive, and networking resources, where the virtualization control system is configured to partition the physical resources into virtual resources including virtual processor, memory, and storage resources for a plurality of virtual servers. Contents of a plurality of virtual memory storage locations are determined, where the virtual memory storage locations span multiple virtual servers. A runtime state of the virtual environment is determined based on the contents of the virtual memory storage locations. The runtime state of the virtual environment is verified for correctness or compared with a baseline state to identify a deviation from the baseline state, and a corrective action is performed when the discrepancy meets a predetermined criteria.

23 Claims, 17 Drawing Sheets

Home  Services  Evidence  Configure  Portal  Logout

| Name | Status | Created | Hash | Report |
|---|---|---|---|---|
| Malware | Analyzed | 01/04/2010 | 5740726ea95ca7e5ed61b5c7dd0338b7 | Download |
| ITD_HOOK | Analyzed | 10/07/2008 | ISCSI_SAMPLE_34 | Download |
| BOOTBOOT | Analyzed | 10/07/2008 | ISCSI_SAMPLE_35 | Download |
| DKOM | Analyzed | 10/07/2008 | ISCSI_SAMPLE_36 | Download |

*Fig. 14*

SYSTEMS AND METHODS FOR ANALYSIS OF ABNORMAL CONDITIONS IN COMPUTING MACHINES

CROSS-REFERENCE TO RELATED APPLICATIONS

This application claims priority to U.S. Provisional Patent Application No. 61/422,033, filed on Dec. 10, 2010, and entitled "Systems and Methods for Analysis of Abnormal Conditions in Computing Machines," the entirety of which is incorporated herein by reference.

FIELD

The technology described in this patent document relates generally to cloud computing and more particularly to cloud computing intrusion detection.

BACKGROUND

A virtual computing environment may provide mechanisms for provisioning and managing one or more customer virtual data centers (virtual servers). A virtual computing environment may include one or more physical data centers each comprising processor, storage and network infrastructure that may be shared by a plurality of customers. Such a virtual computing environment may include a variety of managed hosting or co-location computing platforms. These platforms may provide virtual resource capabilities for the plurality of customers by employing a virtualization control system that abstracts and granularizes the processor, storage, and network hardware into virtual resources that may be allocated in order to provide each customer with a virtual server that meets that customer's computing needs.

FIG. 1 is a system diagram 100 of a virtual computing environment including a virtualization control system 102. The environment 104 includes storage infrastructure 106, server infrastructure 108, and network infrastructure 110. This infrastructure is controlled and managed by the virtualization control system 102, which may be, for example, the Virtual Center Management Server from VMWare, or any other type of system for virtualizing the storage, server, and network infrastructure resources. The virtualization control system 102 is configured and managed by a system administrator 112, which is typically associated with the owner/operator of the virtual environment 104.

One common use of such a virtual computing environment 104 is for hosting customer web sites. Web browsers 114 access a customer's hosted web site via the Internet 116, which connects to the managed hosting platform 100 via one or more connections 118 to the network infrastructure 110. Customer systems 120 may also access and control the application environment of their virtual resources through an Internet connection and may also have access to a system viewing component of the system 104 that enables the customer to view the configuration of their virtual resources hosted by the managed hosting platform 104.

SUMMARY

In accordance with the teachings provided herein, systems and methods are provided for detecting an anomalous condition in a virtual computing environment having a virtualization control system coupled to a physical server, disk drive, and networking resources, where the virtualization control system is configured to partition the physical resources into virtual resources including virtual processor, memory, and storage resources for a plurality of virtual servers. Contents of a plurality of virtual memory storage locations are determined, where the virtual memory storage locations span multiple virtual servers. A runtime state of the virtual environment is determined based on the contents of the raw virtual storage devices (memory, disk, registers, etc) at an arbitrary point in time. The runtime state of the virtual environment is verified for correctness and compared with a baseline state to identify a deviation from the baseline state, and a corrective action is performed when the deviation meets a predetermined criteria.

As another example, a computer-implemented system for detecting an anomalous condition in a virtual computing environment includes a plurality of physical servers that include physical resources, where the physical resources include physical memory, physical storage, and physical processor resources. A virtualization control system is coupled to the physical servers, where the virtualization control system is configured to partition the physical resources into virtual resources including virtual processor, memory, and storage resources for a plurality of virtual servers. An environment validation engine is configured to determine contents of a plurality of virtual memory storage locations, where the virtual memory storage locations span multiple virtual servers, determine a runtime state of the virtual environment based on the contents of the virtual memory storage locations, compare the runtime state of the virtual environment with a baseline state to identify a deviation from the baseline state, and perform a corrective action when the deviation meets a predetermined criteria.

BRIEF DESCRIPTION OF THE DRAWINGS

FIGS. 12-16 depict a graphical user interface that may be provided to a user or analyst.

DETAILED DESCRIPTION

Figure 1:
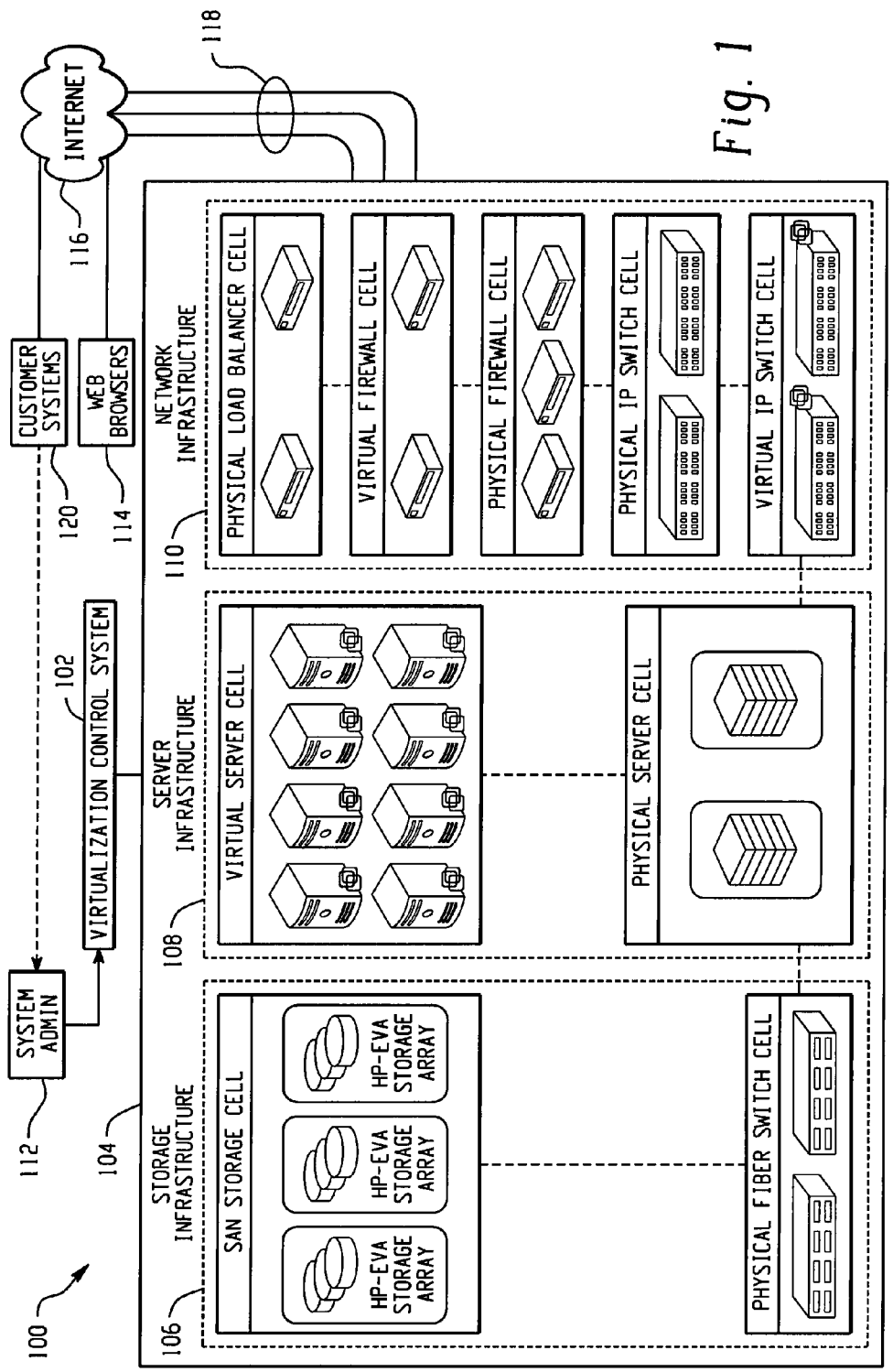
FIG. 1 is a system diagram of a managed hosting computer platform including a virtualization control system.

A virtual computing environment, sometimes referred to a cloud computing environment, offers a location independent computing experience, where a user can utilize physical computing resources located at a remote site, regardless of the current location of the user, as long as the user is able to access the virtual computing environment via a network, such as the Internet. A virtual computing environment includes one or more physical servers that include physical resources that are made available to customers to use via virtual servers. A virtual server may be assigned (provisioned) a certain portion of one or more physical servers' resources to utilize. A user may interact with a virtual server to perform a variety of activities. For example, a user may interact with a virtual server to store data in provisioned virtual storage resources or execute applications or process algorithms using provisioned virtual memory and virtual processor resources. A user may also make the virtual resources of his virtual server available to others for use, such as by using his virtual server as a web server that provides various functionalities of a web site for user interaction.

Because a virtual computing environment can support multiple virtual servers that belong to different users operating on single physical servers, the virtual computing environment offers certain challenges in system security and intrusion detection. Typical single server configurations offer a compartmentalization that may buffer individual physical servers from malicious attacks. For example, an intrusion in a single physical server environment may not propagate to infect other physical servers unless the malicious code is able to transfer to the other physical servers, such as via a network, and overcome intrusion defenses of the other physical servers. Because the different physical servers may have varying degrees of intrusion protection implemented, the influence of malicious code executed on one physical server may be relatively limited on other physical servers.

In contrast, when a virtual server occupying some of the resources of a physical server is infected, the other virtual servers on that physical server are at a significantly heightened risk. Because the other virtual servers are on the same physical server machine using shared resources such as memory and hard disk storage, many additional avenues of infection propagation are present between the virtual servers (e.g., via shared memory, via shared hard drive storage, via shared processing resources, via a network) than are available between physical servers (e.g., via a network). Thus, an infection introduced to one virtual server (e.g., via a lax intrusion prevention protocol) may quickly spread to all other virtual servers that share physical server resources with the compromised virtual server.

Traditional intrusion prevention measures (e.g., virus scans, firewalls, network traffic monitors) may be insufficient for dealing with such intra-system infections. Typical intrusion prevention measures tend to first "protect the borders" of a system by monitoring network communications into and out of the system for suspicious behavior, such as via a firewall. These conventional systems may further scan by searching a system for "intrusion signatures" indicative of a system compromise. Intrusion signatures are intrusion-type specific (i.e., a signature is associated with a specific intrusion, such as a specific virus), where intrusion signatures must be continually updated at an intrusion detection application to detect the latest forms and types of intrusions.

Traditional intrusion prevention measures may not be suitable for detecting and dealing with system compromises that propagate from within, such as via shared hardware resources such as system memory and hard disk storage. Additionally, the inclusion of traditional intrusion prevention systems at each of a number of virtual servers in a virtual computing environment may offer a large number of points of vulnerability to the virtual computing environment (e.g., by compromising an intrusion prevention system at one virtual server, an entire physical server that provides multiple virtual servers may be infected).

Figure 2:
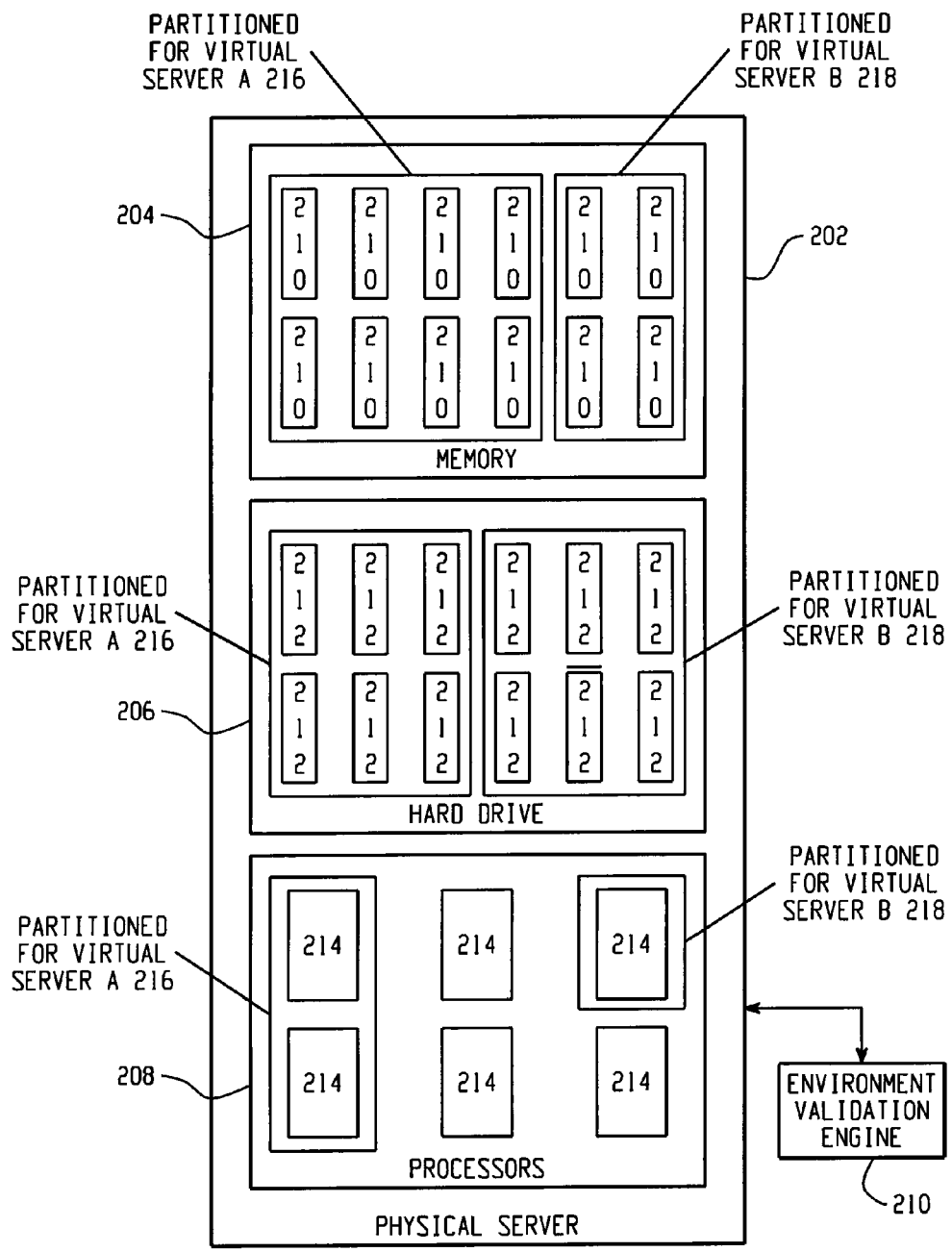
FIG. 2 is a block diagram depicting an environment validation engine that monitors the resources of a physical server used by multiple virtual servers.

FIG. 2 is a block diagram depicting an environment validation engine that monitors the resources of a physical server used by multiple virtual servers. The physical server 202 includes physical memory resources 204, physical storage (hard drive) resources 206, and physical processor resources 208. FIG. 2 depicts the physical memory resources 204 as being divided into segments 210. The physical memory resources 204 may be divided into the segments 210 a variety of ways, such as according to blocks of memory of a particular size (e.g., 500 MB, 1 GB) or according to physical memory packaging delineations (e.g., each block represents one 2 GB RAM chip). The physical storage resources 206 are similarly divided into storage segments 212, which are commonly of uniform size. Additionally, the physical processor resources 208 are divided into processing units 214. Oftentimes one processing unit 214 represents the processing resources of a single physical processor chip.

A virtualization control system is coupled to the physical server 202. The virtualization control system is configured to partition the physical resources 204, 206, 208 into virtual resources that are made available to one or more virtual servers. In the example of FIG. 2, Virtual Server A has been provisioned eight units of virtual memory, six units of virtual storage, and two units of virtual processor, as indicated at 216. Virtual Server B has been provisioned four units of virtual memory, six units of virtual storage, and one unit of virtual processor, as indicated at 218.

An environment validation engine 220 monitors the multiple virtual servers operating on the physical server 202 to detect anomalous conditions. For example, the environment validation engine 220 may determine the contents of a plurality of virtual memory storage locations 204 and virtual hard drive storage locations 206 that span multiple virtual servers provided by the physical server 202. Such a determination may be performed by polling the storage locations 204, 206 in order, randomly, or via a priority system (where locations containing more critical system data are polled more often). Based on the determined contents, a runtime state of the virtual environment is determined. The determined runtime state is compared to a baseline state, such as a representation of the physical server at a previous time when the physical server was known to be operating in a secure and trusted state (e.g., the threads operating on a physical server, the operations being performed by those threads), or verified for correctness. Differences between the runtime state and the baseline state are identified as deviations. If those deviations meet certain predefined criteria (e.g., the differences indicate an unauthorized modification of a virtual system's operating system code), then a corrective action may be indicated (e.g., indicating a system administrator, removing malicious software code).

Figure 3:
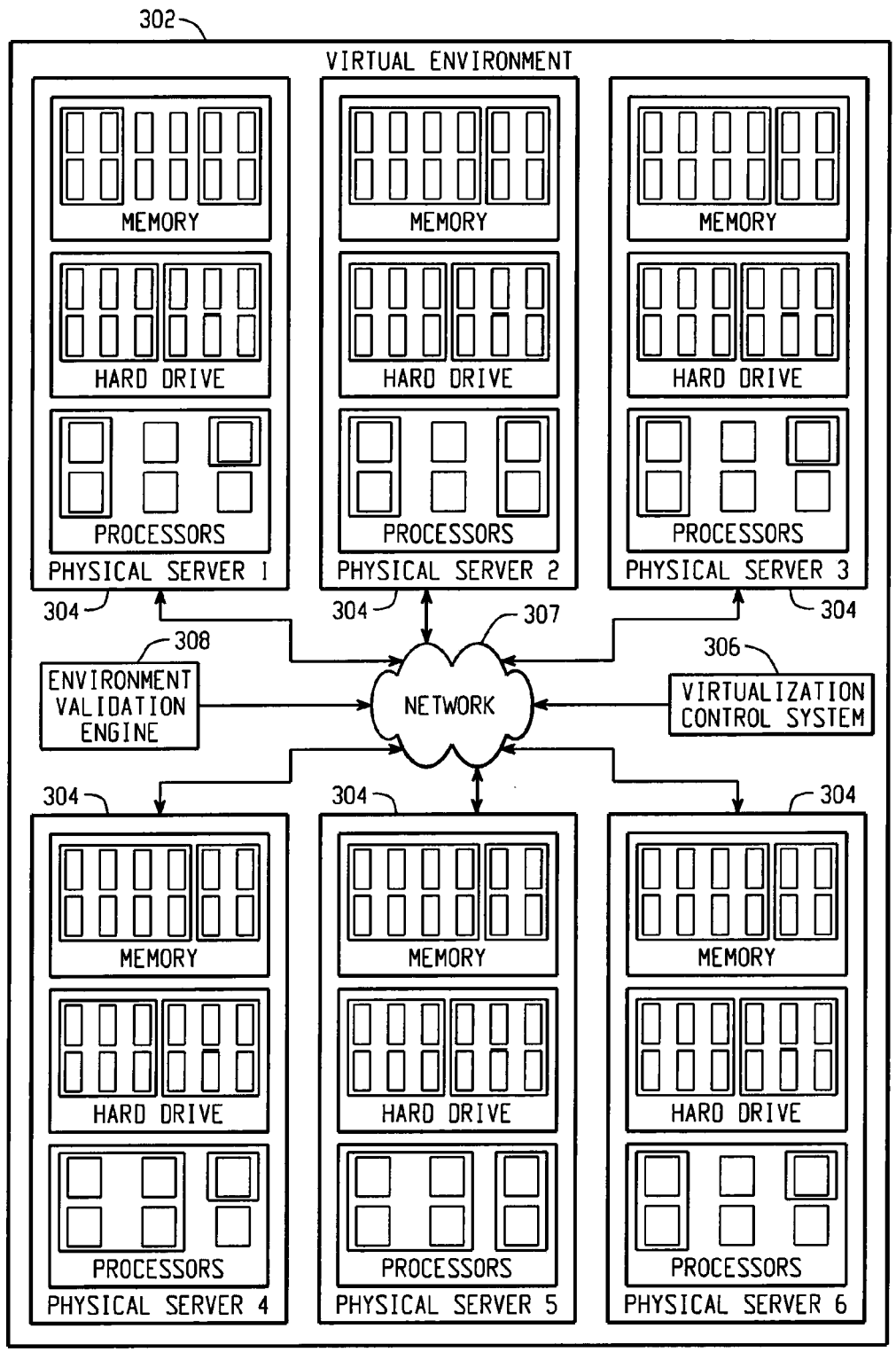
FIG. 3 is a block diagram depicting interaction of an environment validation engine with multiple physical servers.

FIG. 3 is a block diagram depicting interaction of an environment validation engine with multiple physical servers. A virtual environment 302 includes a number of physical servers 304, each of the physical servers 304 including physical memory, physical hard drive storage, and physical processor resources. The physical resources are provisioned using a virtualization control system 306 that may be present on one of the physical servers 304 or on a different server in the virtual environment network 307, as shown in FIG. 3. The physical resources are divided among a plurality of virtual servers, such as according to customer requests based on anticipated or actual virtual server resource needs. For example, one virtual server may be provisioned virtual memory resources spanning two of the physical servers 304 for providing a web server that transmits a popular website via the Internet.

An environment validation engine 308 monitors the multiple physical servers 304 in the virtual environment 302 to validate that the virtual environment 302 is operating in a trusted, stable condition. When the virtual environment 302 is outside of a trusted condition, the environment validation engine 308 provides notifications to responsible personnel, provides interfaces for diagnosing the current system state, and performs corrective actions based on the current system state. The environment validation engine 308 may be present on one of the physical servers 304 or may be provided on another server in the virtual environment 302, as depicted in FIG. 3.

The centralized validation operations provided by the environment validation engine 308 eliminate certain deficiencies of traditional host based monitoring configurations, where software, such as virus scan applications, are deployed on each of the virtual servers maintained in the virtual environment. For example, the environment validation engine performs validation operations from a single point in the virtual environment such that updates and upgrades to the environment validation engine 308 may be performed in a single procedure. In contrast, when virus scan applications are distributed on virtual servers throughout the virtual environment, updates (e.g., virus definition updates) may need to be made at each of a very large number of virtual servers.

Security of the integrity of the single, environment validation engine 308 is also easier to maintain at a single point, in contrast to distributed intrusion scan/detection configuration having intrusion detection software being present on each or many of the virtual servers. By reducing the required trusted computing base containing code necessary for maintaining system security, the probability of an attack that successfully disables the environment validation engine 308 and subsequently the virtual environment 302 is diminished.

The centralized environment validation engine 308 also guarantees that at least a minimum level of system security is applied to each virtual server, which better ensures the overall security of the virtual environment 302. When system integrity monitoring duties are delegated to individual virtual servers controlled by third party customers, it may be difficult to enforce minimum standards in intrusion detection and prevention. When a single virtual system infection can quickly spread throughout the virtual environment, as described above, security breakdowns at individual virtual servers can be catastrophic to the virtual environment 302. Because the environment validation engine 308 is applied to virtual servers on the physical servers 304 of the virtual environment 302, at least the level of protection provided by the environment validation engine 308 is guaranteed at each of the virtual servers.

Additionally, the environment validation engine 308 can reduce operating costs for customers using the virtual environment 302. In many implementations, customers are charged according to virtual resource usage (e.g., actual system memory used, actual hard disk storage used, actual processing capabilities used). When traditional security monitoring applications are distributed among individual virtual servers, customers responsible for those virtual servers may be charged for memory, storage, and processor used for providing the security functions. Because the environment validation engine 308 is external to the individual virtual servers, integrity monitoring can be performed without infringing on or requiring additional resources of the virtual servers in the virtual environment 302.

Figure 4:
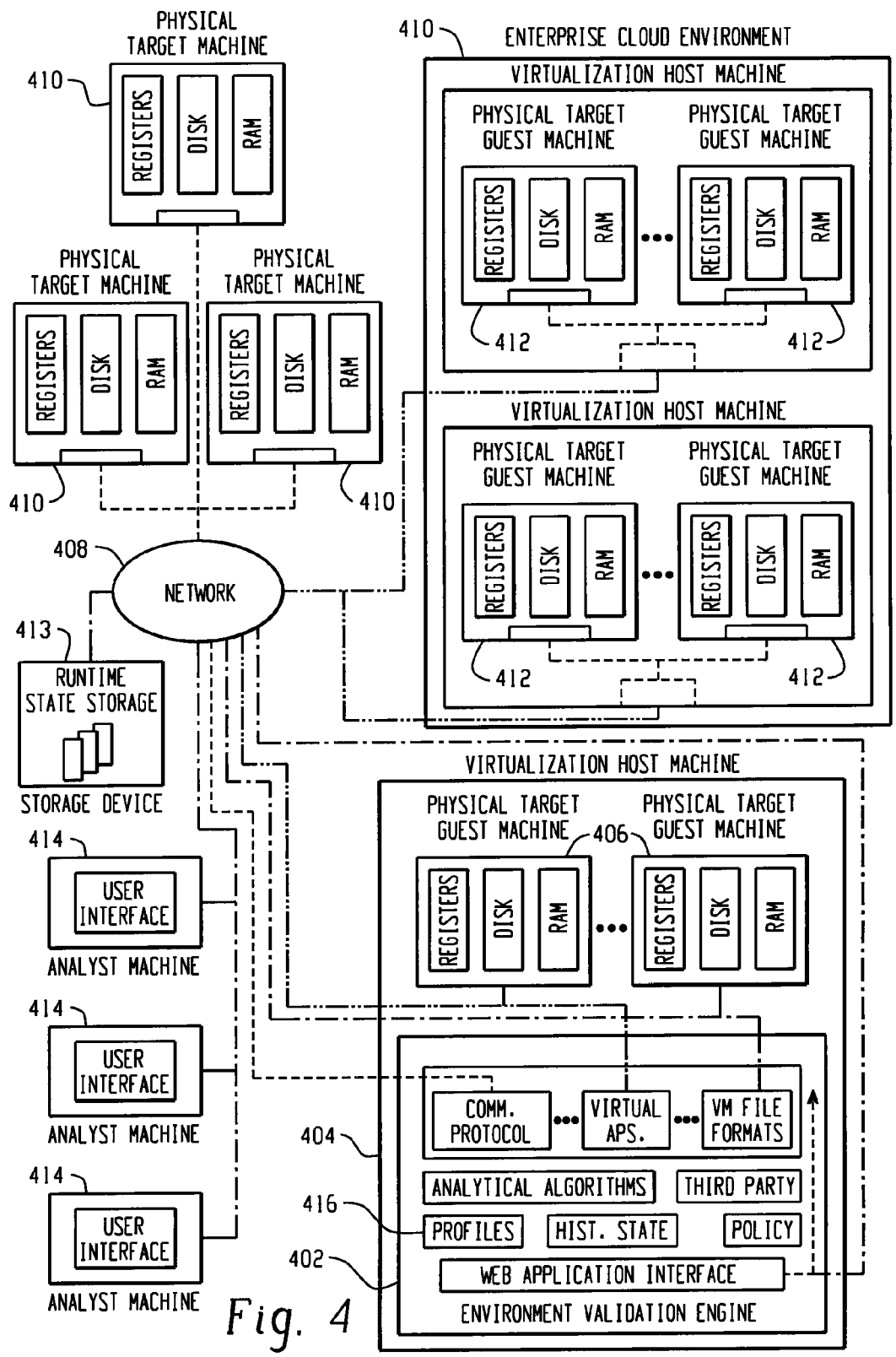
FIG. 4 is a block diagram depicting an environment validation engine operating in a cloud virtual environment.

FIG. 4 is a block diagram depicting an environment validation engine operating in a cloud virtual environment. An environment validation engine 402 operates on a virtualization host machine physical server 404. In addition to the environment validation engine 402, the physical server 404 has resources that are provisioned for a plurality of virtual servers 406. The physical server 404 containing the environment validation engine 402 is connected to a network 408. The network 408 connects the environment validation engine 402 to a number of other physical servers 410, where those other physical servers 410 have physical resources that are provisioned to a plurality of virtual servers 412.

The network also connects the environment validation engine 402 to a runtime state data store 413. The runtime state data store 413 contains data related to a current runtime state of the virtual environment (e.g., contents of polled virtual memory storage locations) and determined states of the virtual environment (e.g., a tree representation of the current runtime state) as well as baseline states of the virtual environment, such as a runtime state of the virtual environment during a time when the virtual environment was known to be operating in a trusted, stable state.

The network 408 further connects the environment validation engine 402 to one or more analyst machines 414 that provide interfaces for an analyst to interact with the environment validation engine 402 and other aspects of the virtual environment. For example, alerts regarding identified deviations of the runtime state of the virtual environment from a baseline state may be provided to an analyst machine 414 as a corrective action to alert an analyst that further measures may need to be taken. The environment validation engine 402 may also inform an analyst of corrective actions taken by the environment validation engine 402 autonomously, such as removing detected malicious code in the virtual environment. The analyst machines 414 may also be provided user interfaces for diagnosing issues within the virtual environment, such as user interfaces that display data about the runtime state of the virtual environment.

The environment validation engine 402 can access runtime data from the servers of the virtual environment via APIs exposed by the virtualization platform, by accessing data stored on remote network attached storage, by accessing data stored in remote devices using storage area network (SAN) protocols, or by directly accessing file formats used by virtualization software for storing system states.

The environment validation engine 402 can rebuild the runtime state of the virtual environment by accessing exposed raw data stores (e.g., RAM memory, hard disk storage) associated with the machines in the environment. For example, the raw data can be exposed and accessed through the hypervisor or virtual machine storage formats. Access to raw data for machines that have been suspended may also be obtained.

Memory analysis can be challenging in some implementations in that access to contents of virtual memory storage locations may be tied to characteristics of the operating system of the associated virtual server. Given a variety of operating systems currently being utilized (e.g., Windows, Linux, OSX) as well as the frequency with which operating systems are updated, such access can be challenging. To address this challenge, the environment validation engine 402 may include operating system profiles 416 that provide the specification necessary for accessing contents of virtual memory storage locations associated with different operating systems and hardware architectures. The profiles can be developed based on information provided by operating system developers (e.g., debugging code, source code). Using the profiles 416, the environment validation engine 402 can adapt as deployed software is updated, new applications are introduced, and new versions of operating systems are released.

Figure 5:
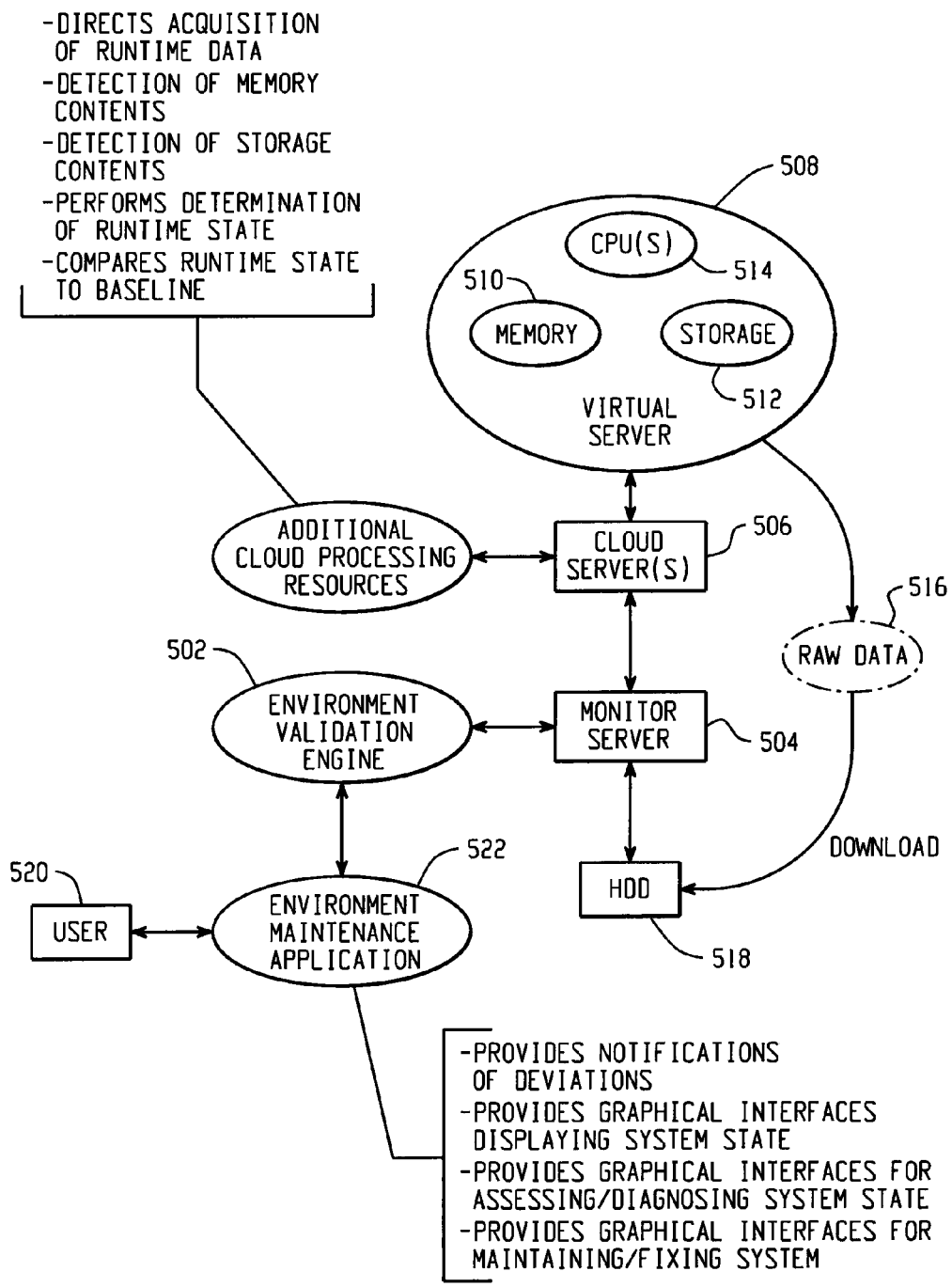
FIG. 5 depicts an example environment validation engine implementation.

FIG. 5 depicts an example environment validation engine implementation. An environment validation engine 502 is included on a monitor server 504 that is responsive to one or more cloud servers 506. One of the virtual servers in the cloud is depicted at 508. The virtual server 508 includes provisioned memory 510, storage 512, and processor 514 resources available to the virtual server 508 for use. The environment validation engine 502 directs the capture of raw data 516 associated with the virtual server, such as memory 510 contents, storage 512 contents, and running processes and threads, where the captured data is stored at 518 for analysis.

Using the captured data, the environment validation engine performs a determination of the runtime state of the virtual environment. For example, the environment validation engine 502 may employ a semantic modeling process, where a semantic model of the runtime state of the virtual server's operating system is constructed, representing both memory and disk. The semantic model models both static and dynamic control flow of the operating system and associated resource (e.g., memory) allocations. The semantic model is used to track how the system evolves over time, such as by analyzing runtime states over time. The semantic model also provides a mechanism for enumerating how a malware sample represents itself within the runtime state of the system by comparing how the model of the system's runtime state changes once malware has been installed. These differences indicate how malware manifests within the runtime state and can provide indicators that can be used to search the virtual environment for other virtual servers.

To illustrate utilization of a semantic model technique, an environment validation engine can be employed with semantic models as a virtual appliance to support an incident response engagement. The environment validation engine allows the incident responders to remotely access systems within the virtual environment and triage information systems within the environment. The environment validation engine also allows the incident responder to search the virtual environment for threats that are persisting undetected within the runtime state of the environment.

The environment validation engine 502 may provide interfaces to an incident responder user 520 via an environment maintenance application 522. The environment maintenance application 522 can provide notifications of detected deviations of the runtime state of a virtual environment from an expected baseline state. The application 522 can provide graphical interfaces for displaying a runtime state of an environment as well as interfaces for assessing and diagnosing the runtime state. The environment maintenance application 522 can also provide graphical interfaces for maintaining and fixing a virtual environment being analyzed.

As another illustration, a environment validation engine can be utilized not only with respect to whether malware exists, but as to whether new software deployed within a virtual environment is causing virtual servers to deviate from expected runtime states, such as an unapproved program being installed or a required operating system patch not being deployed. The environment validation engine can analyze whether new software is having an unintended effect that causes the runtime state of the virtual environment to deviate from an expected baseline state.

An environment validation engine can be configured to be environment agnostic, such that the environment validation engine can operate in different types of environments, such as cloud environments and physical host environments. Such functionality can be realized using an abstraction layer to view devices in the environments. For example, the environment validation engine may use an address space (AS) abstraction layer that transparently provides an access mechanism to a storage device. For example, by conforming to a defined API, the environment validation engine can access data using a virtualization platforms exposed APIS, virtualization/operating system file formats, operating system APIs, direct hardware support, SAN communication protocols. The environment validation engine may also include a hardware abstraction layer that allows transparent access to data regardless of processor architecture of a physical device being analyzed. Such functionality can be advantageous in environments such as hybrid environments, where physical and virtual machines are implemented.

Figure 6:
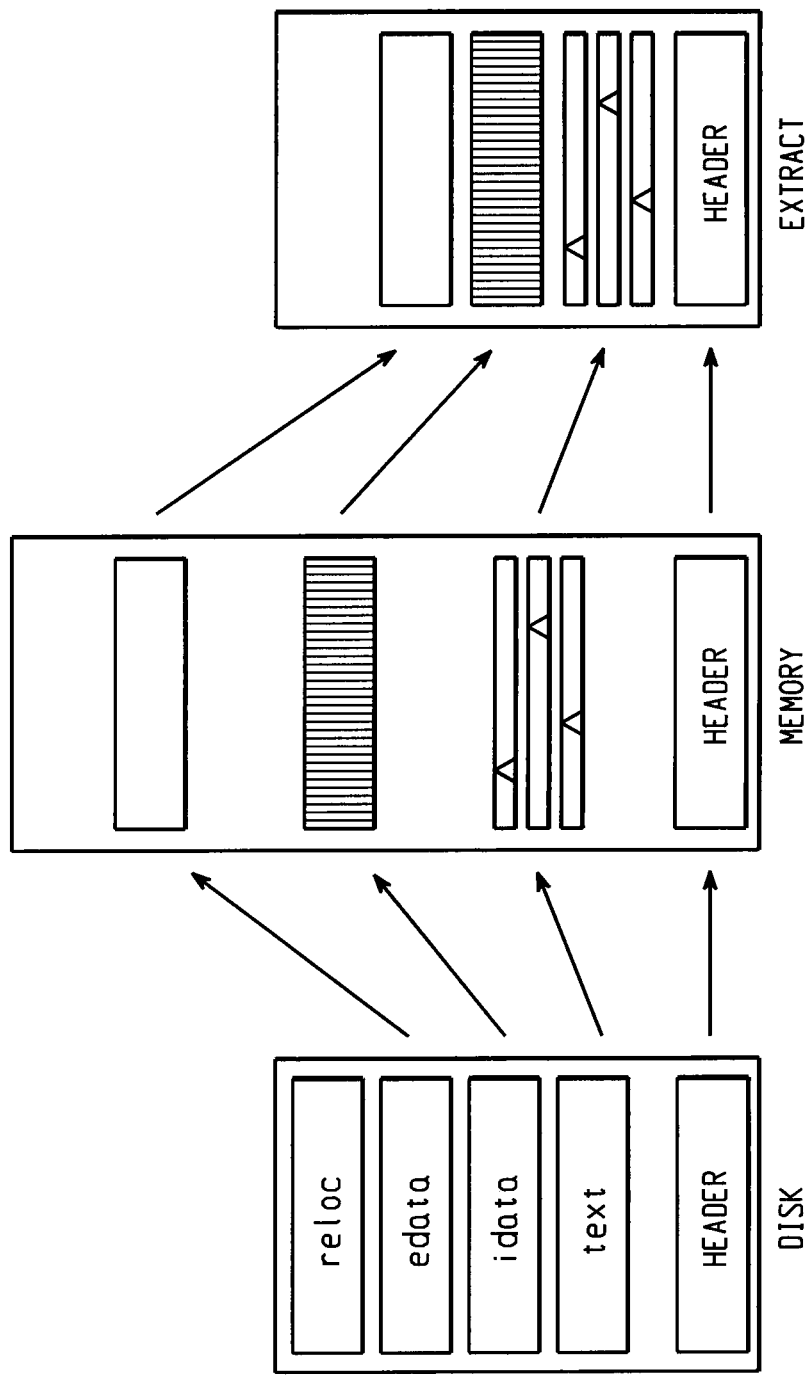
FIG. 6 depicts an environment validation engine performing a normalization process for identifying and verifying executable segments of text found within examined virtual memory storage locations.

FIG. 6 depicts an environment validation engine performing a normalization process for identifying and verifying executable segments of text found within examined virtual memory storage locations. FIG. 6 demonstrates normalizations that may be performed on different sections (e.g., reloc, edata, idata, and text) found within a portable executable (PE) format. For example, reloc represents program relocation entries, edata is associated with exported data and lists symbols exported from a file, and idata lists symbols imported into a file.

By leveraging a trusted software database, operating system context, and hardware architecture context, an environment validation engine can normalize memory resident executable text, reverse the transformation performed by the operating system loader, and verify that the executable code has not been maliciously modified. Such a mechanism can be supported using data exposed by application or operating system vendors that enable verification of trusted states of machines.

Normalization techniques can also be used to verify the states of different virtual servers within the virtual environment that use the pages for determining what percentage of executable code in a virtual server's virtual memory has been verified. Once the executable code has been verified, the environment validation engine verifies a virtual server's stack and heap and other memory components, whereby those components can then be utilized as trusted components. In this way, the environment validation engine can utilize trust that has already been established to determine whether other components in the virtual environment should be trusted.

Figure 7:
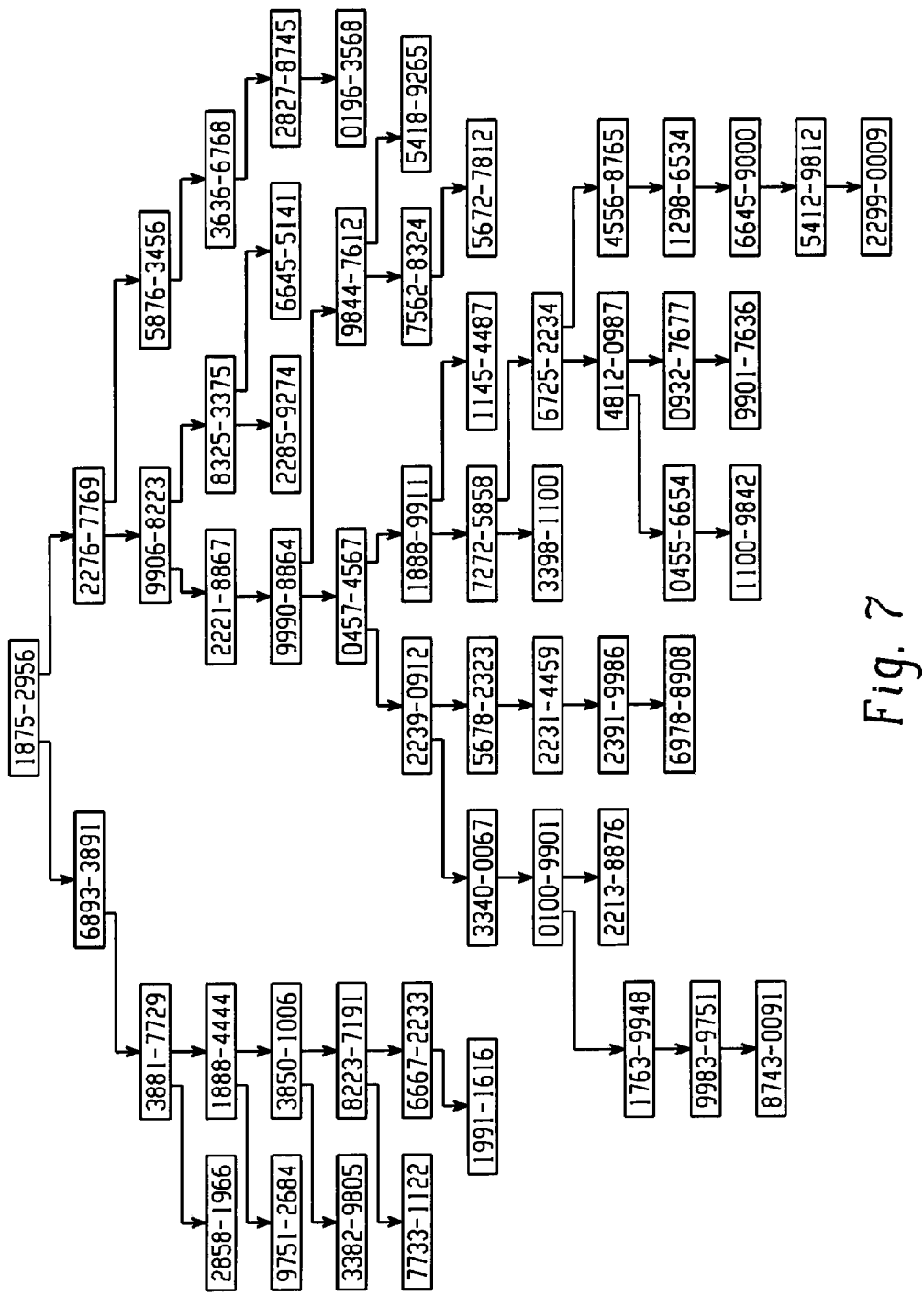
FIG. 7 represents the process of determining the changes malicious software has made to the runtime state of a system.

FIG. 7 presents a graphical representation of a tree data structure identifying a baseline state for a virtual environment. Such a baseline tree data structure can be generated by analyzing a virtual environment, such as by examining contents of virtual memory storage locations, during a time period when the virtual environment is known to be operating in a trusted state. The baseline tree data structure provides a point of comparison for an environment validation engine, where deviations of a runtime tree data structure from the baseline tree data structure are identified as deviations that may warrant corrective action.

Figure 8:
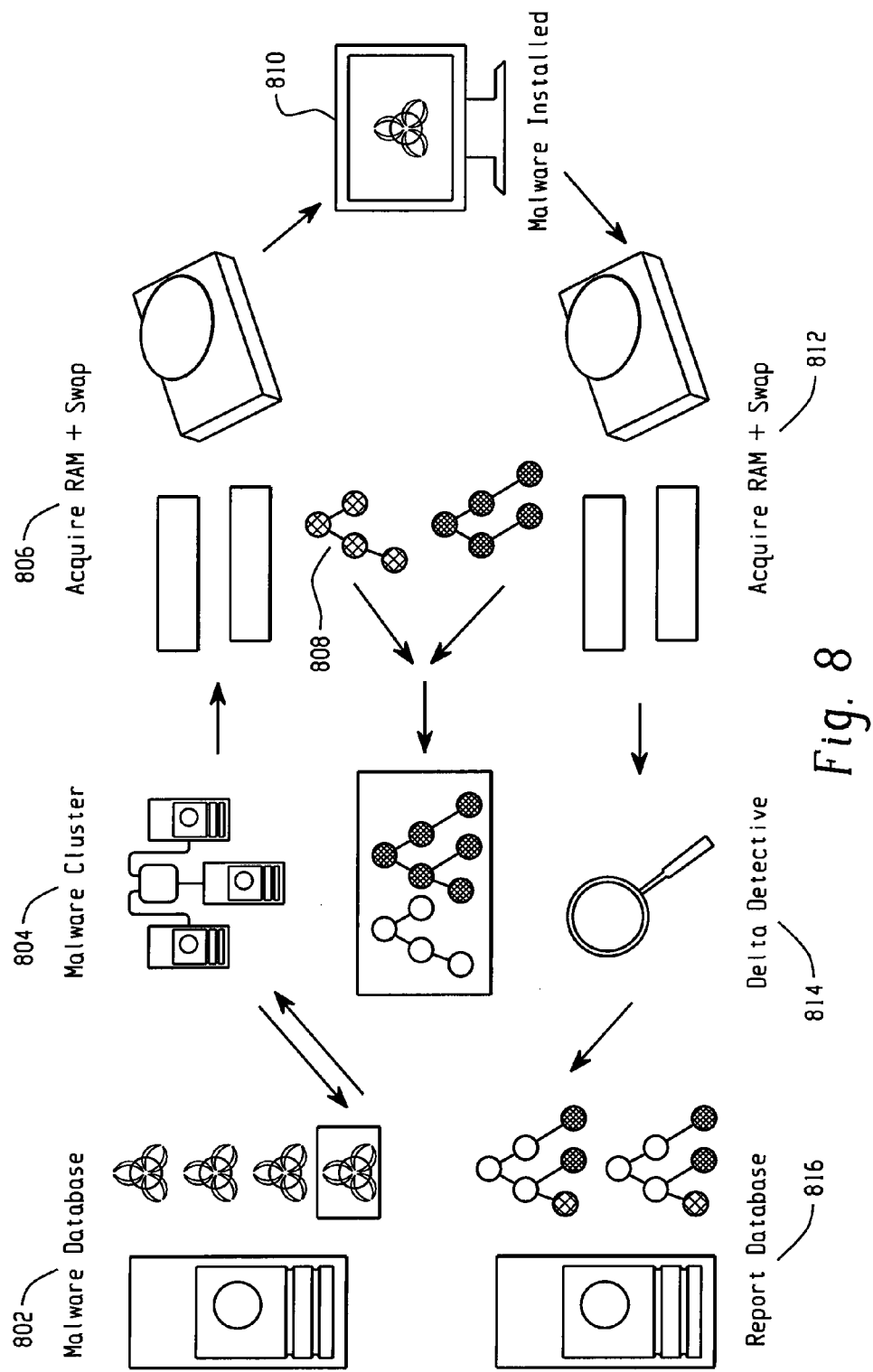
FIG. 8 depicts a tree data structure representation of a system state that can be used by an environment validation engine to identify deviations that may need corrective action.

FIG. 8 depicts the modification of a virtual environment system state via a malware infection. A malware source 802 provides a portion of malware code to a cluster of victim computing machines 804. The victim machines 804 are infected, wherein the malware code modifies the runtime state of the victim machines, oftentimes for nefarious purposes such as access to sensitive data or unauthorized use of victim machines (zombification). A malware infestation may manifest by adding or modifying memory storage location contents or relationships among operating system or application components. In the example of FIG. 8, the malware code modifies data stored in RAM 806 such that a runtime state tree data structure representing the current runtime state is modified, as shown at 808. Having completed the modification to the runtime state, the malware is installed at 810 and may perform malicious activities until detected and removed. An environment validation engine may detect the malware by determining the contents of a plurality of virtual memory storage locations at 812 and analyzing differences in a determined runtime state tree data structure from a baseline tree data structure. When the environment validation engine detects a deviation that meets a predetermined criteria at 814, the deviation is reported to a database at 816, whereupon a corrective action may be performed.

Figure 9:
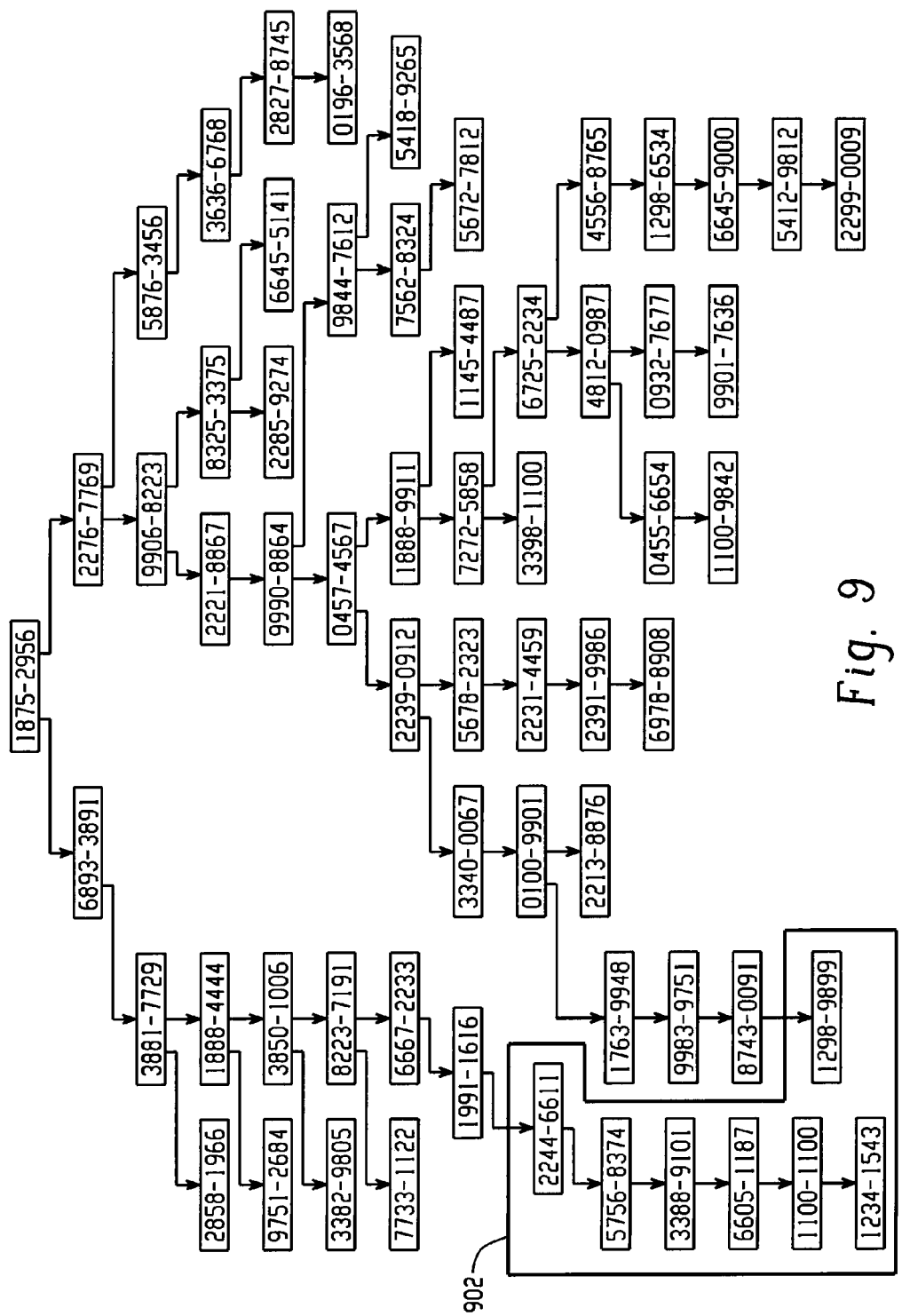
FIG. 9 depicts a runtime tree data structure that manifests the incorporation of unauthorized code.

FIG. 9 depicts a runtime tree data structure that manifests the incorporation of unauthorized code. An environment validation engine analyzes the current virtual environment system state and develops a runtime tree data structure. At 902, a deviation from the baseline tree data structure depicted in FIG. 7 is identified. If the identified deviation meets a predetermined criteria, then a corrective action may be taken.

The predetermined criteria may take a variety of forms. For example, in some implementations, all deviations from the baseline state are actionable and are at least reported to an analyst. In other implementations, deviations associated with critical system components (e.g., deviations with respect to executing operating system code) may require corrective action, but other deviations (e.g., data files loaded into memory) may be considered benign and are not further addressed. In other implementations, similarities between an identified deviation and known deviations caused by malicious code may be computed, and when a deviation is deemed similar (e.g., a computed similarity index is greater than a threshold value), the deviation is considered actionable and a corrective action is performed.

Figure 10:
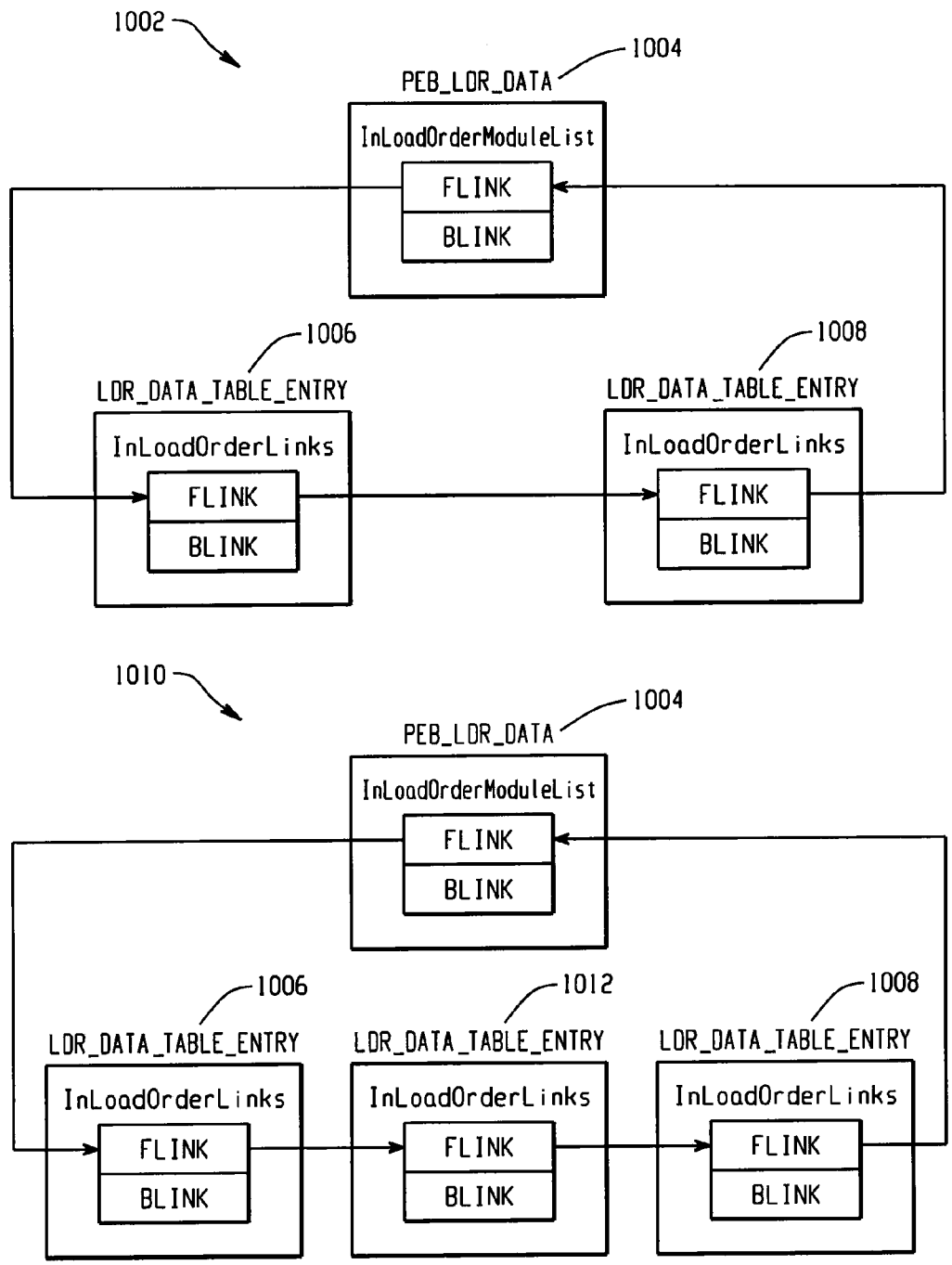
FIG. 10 depicts a linked list representation of a system state that can be used by an environment validation engine to identify deviations that may need corrective action.

FIG. 10 depicts a linked list representation of a system state that can be used by an environment validation engine to identify deviations that may warrant corrective action. A baseline linked list is depicted at 1002 that includes a data record 1004, a first table entry 1006, and a second table entry 1008. The baseline linked list 1002 is considered nominal in a working system. At 1010, a second linked list is depicted that includes additional code at 1012 that has been inserted among the previously existing records 1004, 1006, and 1008. When such a deviation is detected by an environment validation engine, the deviation is evaluated against the predetermined criteria to determine if an action should be taken, and what that action should be. For example, in one implementation, all deviations are reported (e.g., to a database or analyst) for later review, while certain deviations are acted upon automatically by the environment validation engine, such as by extracting malicious code from the virtual environment.

Figure 11:
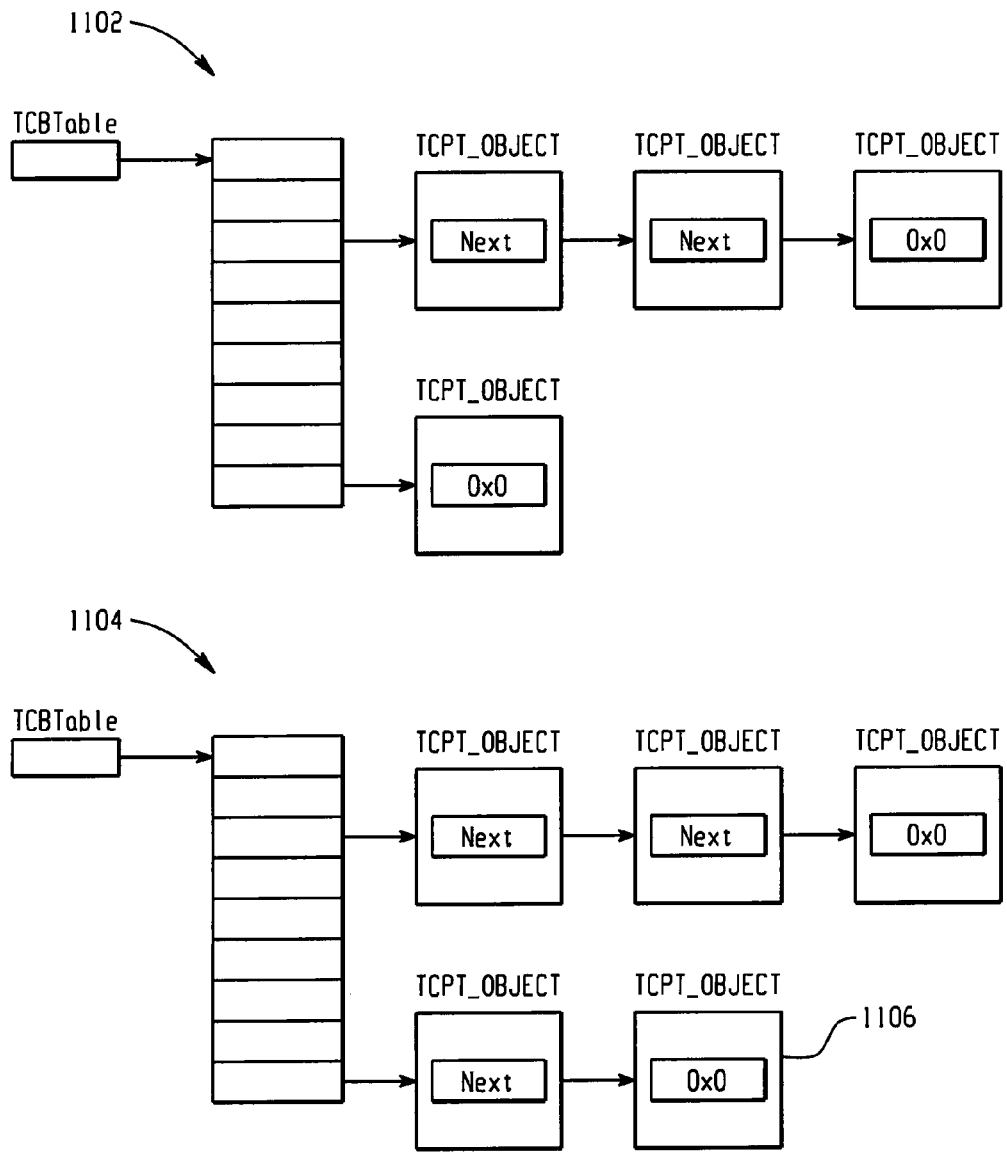
FIG. 11 includes chained hash tables representative of environment operating states.

FIG. 11 includes chained hash tables representative of environment operating states. A baseline chained hash table is depicted at 1102 that represents an operating system's open connections in a trusted state. The chained hash table at 1104 depicts the operating system's open connections following execution of malicious software code. The runtime system state hash table 1104 includes an added record at 1106. When evaluating the runtime system's state, the environment validation engine detects the anomalous entry into the runtime chained hash table 1104 at 1106 and determines whether a corrective action should be taken based on the identified deviation from the baseline state depicted at 1102.

Figure 12:
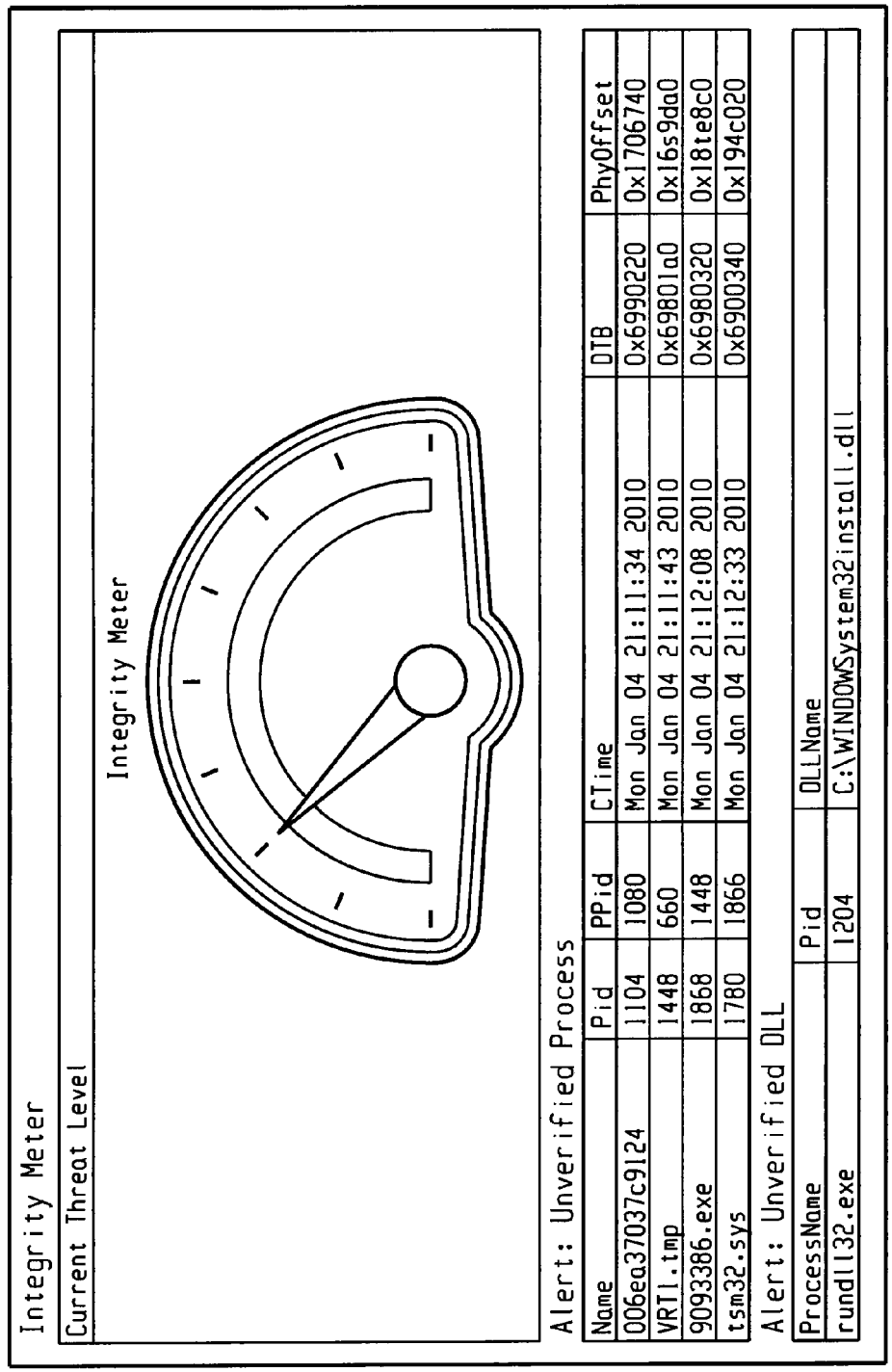

FIGS. 12-16 depict a graphical user interface that may be provided to a user or analyst. FIG. 12 depicts a graphical integrity meter that includes an arc-shaped spectrum. The left-most portion of the spectrum includes the most severe threat level, while the right-most portion of the spectrum indicates that no threat has been detected. In the example of FIG. 12, the integrity meter indicates that a relatively severe threat level has been detected for the selected virtual server. In the depicted case, a number of alerts have been identified including unverified processes and dynamically linked libraries (DLLs). The integrity meter enables triage as to which systems should be prioritized for remediation.

Figure 13:
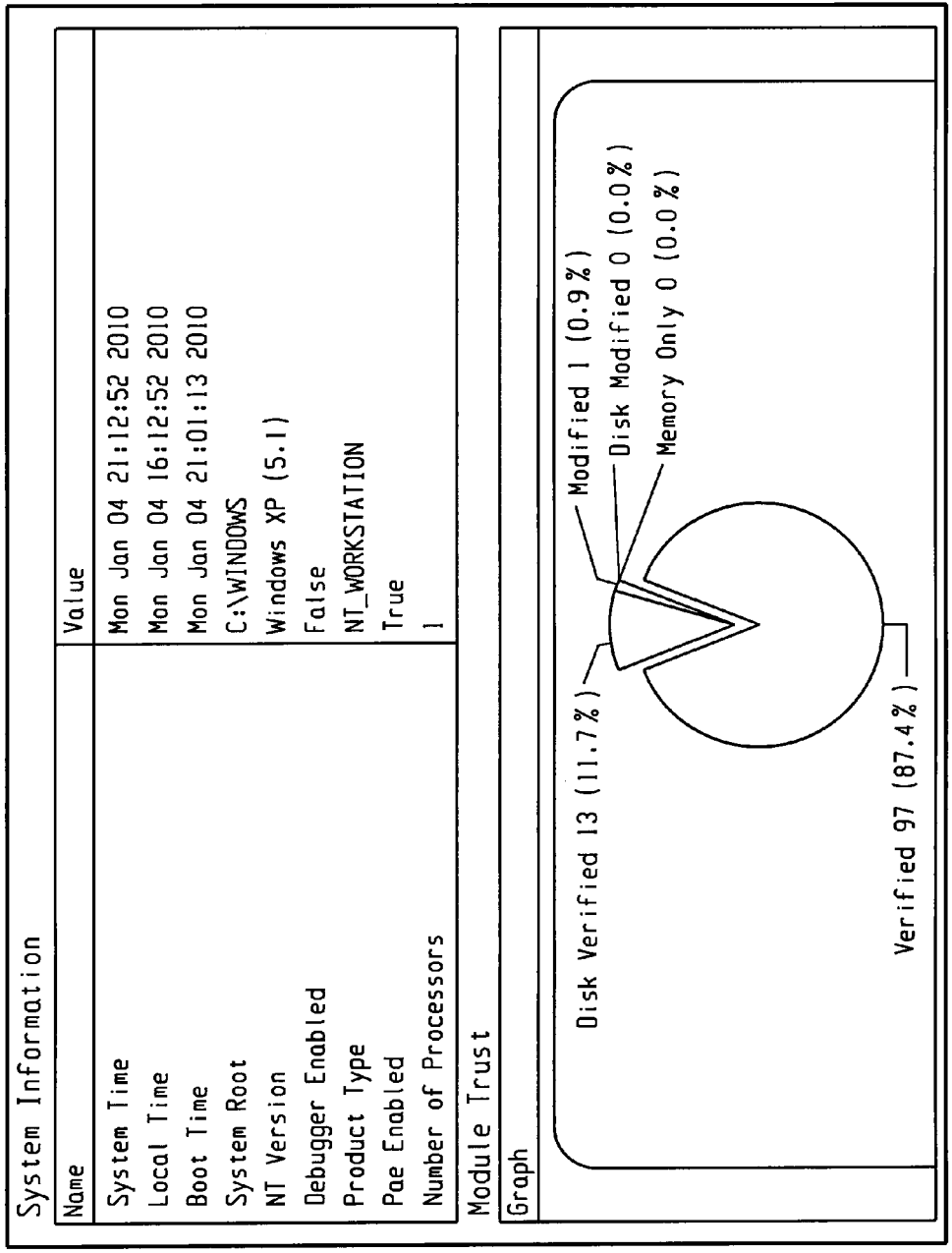

FIG. 13 depicts system information for a virtual server that has undergone analysis. A graph associated with the virtual machine identifies whether code found in memory has been verified as trusted, verified with code found on disk, modified compared to a trusted version, modified compared to executable code found on disk, or exists only in memory.

FIG. 14 depicts a graphical user interface for scheduling, tracking, and triaging analysis efforts across a virtual environment. The interface provides a link that can be selected to display detailed reports about individual components of the depicted analysis.

Figure 15:
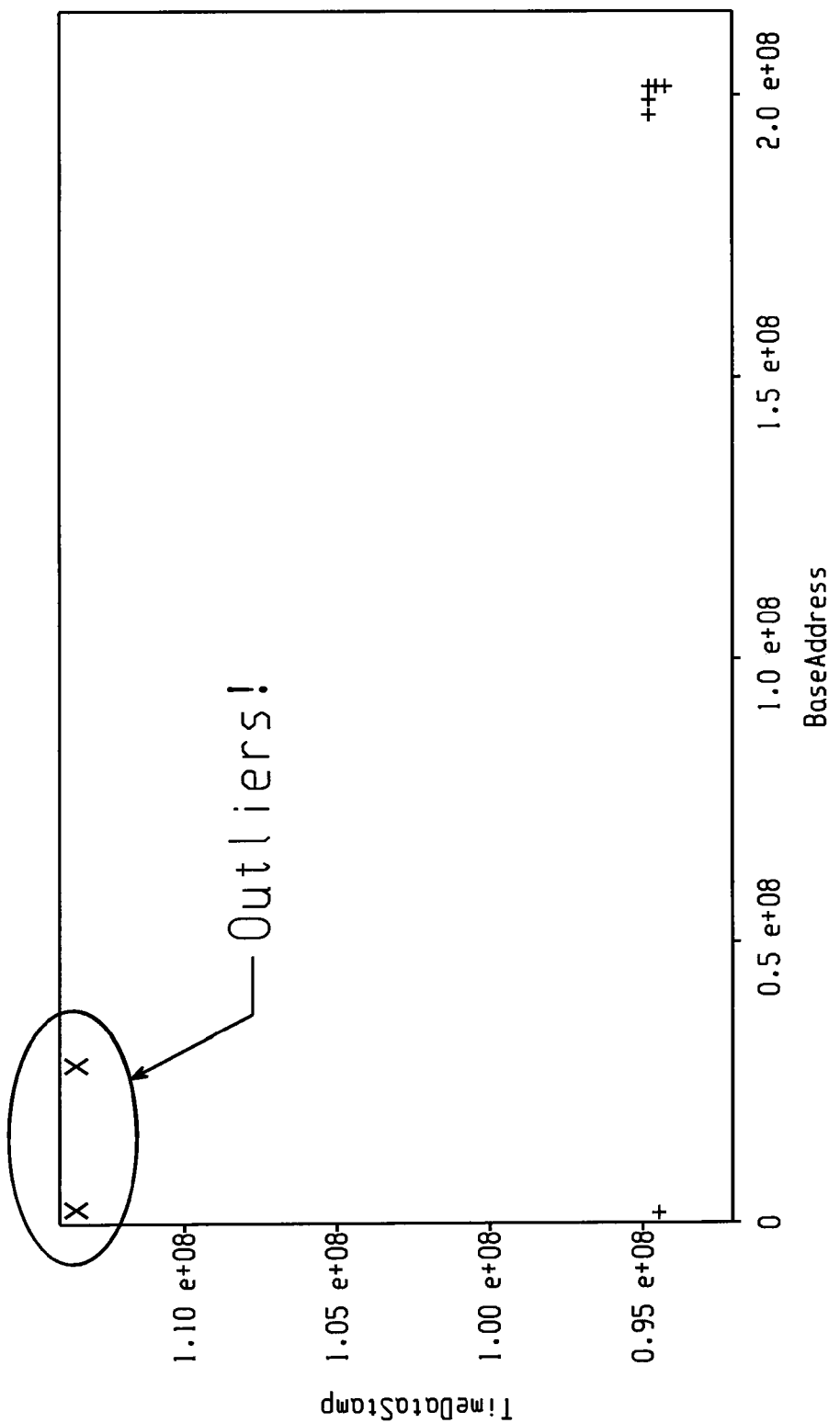

FIG. 15 depicts a first component age diagram that depicts a compile time associated with executable code running on a virtual server by memory location. Most of the executing code is clustered at the lower portion of the graph, showing a consistent compile time across the clustered code. However, two portions of executing code have a significantly later compile time, prompting the environment validation engine to flag that code as outliers, wherein an analyst is notified of the outliers to prompt further investigation.

Figure 16:
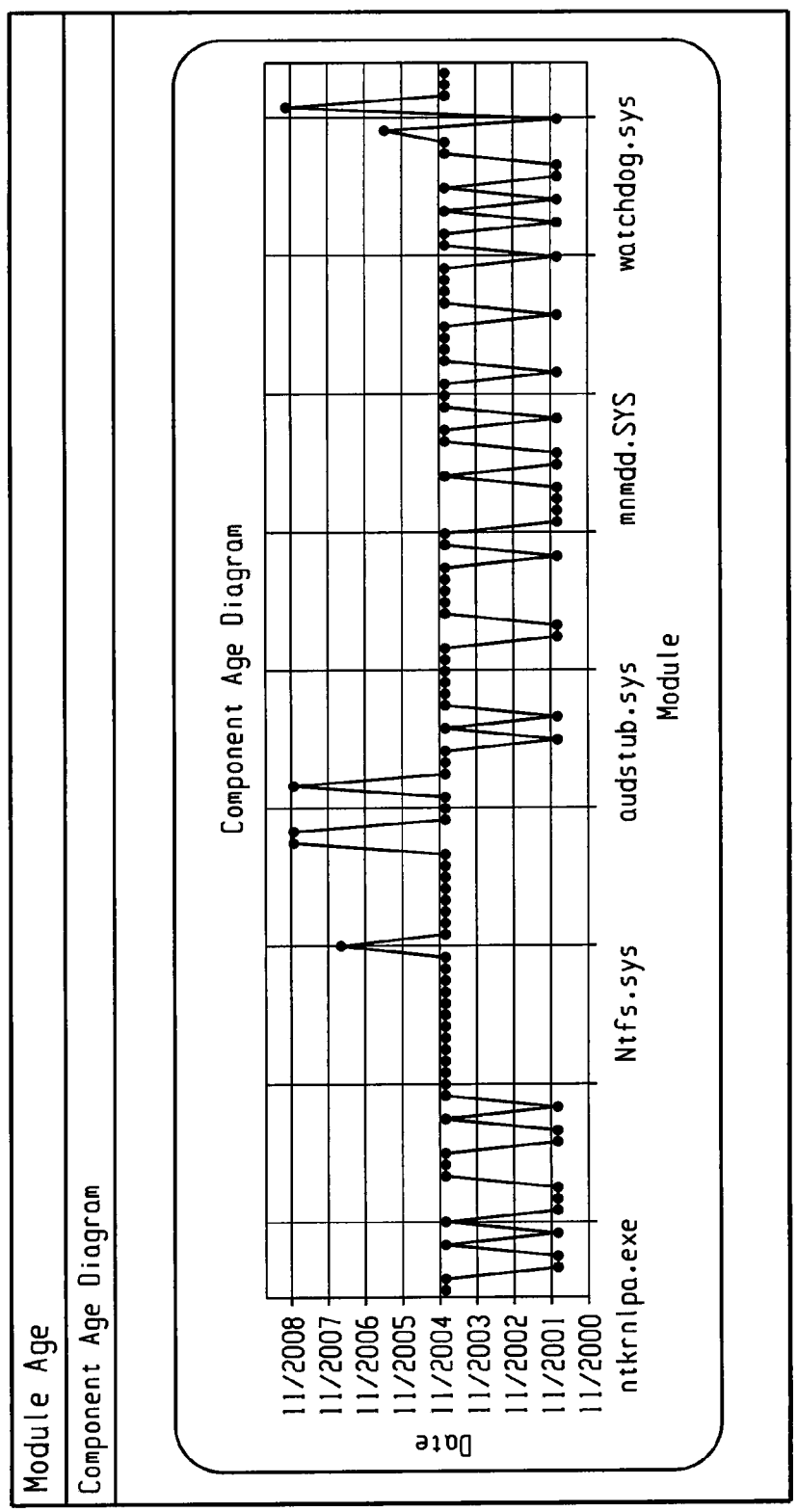

FIG. 16 depicts a second component age diagram that depicts the age of executable running on a virtual server by component name. The second age diagram enables visual verification that operating system components have been patched or updated and also enables analysis as to whether unauthorized changes have been made to system components.

Figure 17:
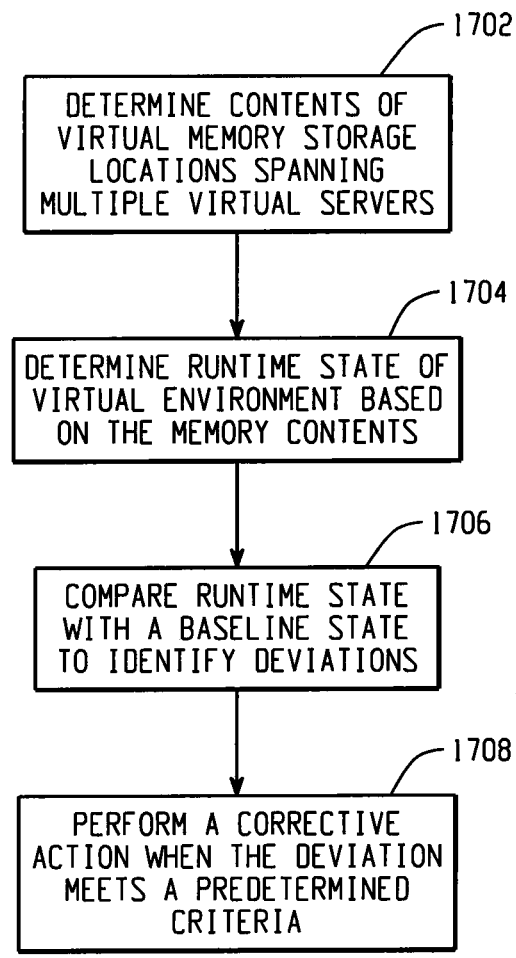
FIG. 17 is a flow diagram depicting a computer-implemented method for detecting an anomalous condition in a virtual computing environment.

FIG. 17 is a flow diagram depicting a computer-implemented method for detecting an anomalous condition in a virtual computing environment. In the environment, a virtual control system is coupled to a physical server, disk drive, and networking resources. The virtualization control system is configured to partition the physical resources into virtual resources including virtual processor, memory, and storage resources for a plurality of virtual servers. At 1702, the contents of a plurality of virtual memory storage locations are determined, where the virtual memory storage locations span multiple virtual servers. A runtime state of the virtual environment is determined at 1704 based on the contents of the virtual memory storage locations. At 1706, the runtime state of the virtual environment is compared with a baseline state to identify a deviation from the baseline state, and at 1708 a corrective action is performed when the deviation meets a predetermined criteria.

One or more of the steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable storage medium providing program code for use by or in connection with a computer or any instruction execution system. Such a storage medium may be a non-transitory storage medium, where the non-transitory storage medium may be a random access memory (RAM). For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory, a read-only memory (ROM), a rigid magnetic disk and an optical disk. Current examples of optical disks include compact disk—read only memory (CD-ROM), compact disk-read/write (CD-R/W) and DVD.

This written description uses examples to disclose the invention, including the best mode, and also to enable a person skilled in the art to make and use the invention. It should be noted that the systems and methods described herein may be equally applicable to other configurations. For example, while the examples depicted herein illustrate selection of a memory coherency protocol for use with an on-chip L1 cache in a processor, the disclosed systems and methods may be used in other implementations such as system caches, coherent bridges, snoop filters, etc. In addition, one or more steps of methods described above may be performed in a different order (or concurrently) to achieve desirable results. The patentable scope of the invention may include other examples that occur to those skilled in the art.

The invention claimed is:

1. A computer-implemented method of detecting an anomalous condition in a virtual computing environment having a virtualization control system coupled to a physical server, disk drive, and networking resources, wherein the virtualization control system is configured to partition the physical resources into virtual resources including virtual processor, memory, and storage resources for a plurality of virtual servers, comprising:
    determining contents of a plurality of virtual memory storage locations, wherein the virtual memory storage locations span multiple virtual servers, wherein the contents of the virtual memory storage locations are accessed using operating system profiles, where an operating system profile is selected to determine contents of a particular memory storage location based upon an operating system of a virtual server associated with the particular memory storage location;
    determining a runtime state of the virtual environment based on the contents of the virtual memory storage locations;
    comparing the runtime state of the virtual environment with a baseline state to identify a deviation from the baseline state; and
    performing a corrective action when the deviation meets a predetermined criteria.

2. The method of claim 1, wherein the corrective action includes removing an unauthorized portion of code from the virtual environment.

3. The method of claim 1, wherein the deviation affects multiple virtual servers.

4. The method of claim 3, wherein the deviation that affects multiple virtual servers is identified using a single comparison of the runtime state with the baseline state.

5. The method of claim 3, wherein the deviation is caused by an infiltration that spread across the multiple virtual servers via physical memory hardware that is shared across the multiple virtual servers.

6. The method of claim 1, wherein the method is performed using a single application using no additional applications deployed on individual virtual servers.

7. The method of claim 1, wherein the deviation is identified based on a detection of an operating system data structure deviating from a trusted state.

8. The method of claim 1, wherein the deviation is identified based on a change in a relationship between two data structures.

9. The method of claim 1, wherein the determining the contents of virtual memory storage locations includes polling virtual memory storage locations across the plurality of virtual servers.

10. The method of claim 1, wherein the comparing includes determining whether critical components of an operating system have been modified.

11. The method of claim 1, wherein the deviation is identified based on the comparison without consideration of any malware signatures.

12. The method of claim 1, further comprising determining contents of virtual non-volatile storage locations that span multiple virtual servers, wherein the determining the runtime state of the virtual environment is further based on the contents of the non-volatile storage locations.

13. The method of claim 1, wherein the contents of the virtual memory storage location are accessed using operating system profiles, where an operating system profile is selected to determine contents of a particular memory storage location based upon an operating system of a virtual server associated with the particular memory storage location.

14. The method of claim 1, wherein fees are charged for virtual server usage of virtual processor and memory, wherein the method is performed without usage of virtual processor associated with any of the plurality of virtual servers.

15. The method of claim 1, the deviation is based on a modification of operating system data structures, a modification of application data structures, anomalous memory allocations, a manipulation of relationships among data structures, an incorporation of foreign or un-trusted capabilities or code, or a violation of compliance or organizational policies.

16. The method of claim 1, wherein the corrective action includes providing a notification of the deviation and providing a virtual appliance configured to support an incident investigation and response.

17. The method of claim 16, wherein the virtual appliance includes an integrity meter display, wherein the integrity meter display is updated based on the identification of the deviation.

18. The method of claim 16, wherein the virtual appliance includes a component age display that depicts dates of implementation or modification associated with components of the virtual computing environment.

19. The method of claim 1, wherein the runtime state is represented using a first tree structure, wherein the baseline state is represented using a second tree structure, and the runtime state is compared with the baseline state by comparing the tree structures.

20. The method of claim 1, wherein the deviation is identified based on an unauthorized data record being incorporated into a linked list.

21. The method of claim 1, wherein the corrective action includes providing a notification of the deviation.

22. A non-transitory computer-readable storage medium encoded with instructions for commanding one or more data processors to execute a method of detecting an anomalous condition in a virtual computing environment having a virtualization control system coupled to a physical server, disk drive, and networking resources, wherein the virtualization control system is configured to partition the physical resources into virtual resources including virtual processor, memory, and storage resources for a plurality of virtual servers, the method comprising:

determining contents of a plurality of virtual memory storage locations, wherein the virtual memory storage locations span multiple virtual servers, wherein the contents of the virtual memory storage locations are accessed using operating system profiles, where an operating system profile is selected to determine contents of a particular memory storage location based upon an operating system of a virtual server associated with the particular memory storage location;

determining a runtime state of the virtual environment based on the contents of the virtual memory storage locations;

comparing the runtime state of the virtual environment with a baseline state to identify a deviation from the baseline state; and performing a corrective action when the deviation meets a predetermined criteria.

23. A computer-implemented system for detecting an anomalous condition in a virtual computing environment, comprising:

a plurality of physical servers that include physical resources, wherein the physical resources include physical memory, physical storage, and physical processor resources;

a virtualization control system coupled to the physical servers, wherein the virtualization control system is configured to partition the physical resources into virtual resources including virtual processor, memory, and storage resources for a plurality of virtual servers; and an environment validation engine configured to:

determine contents of a plurality of virtual memory storage locations, wherein the virtual memory storage locations span multiple virtual servers, wherein the contents of the virtual memory storage location are accessed using operating system profiles, where an operating system profile is selected to determine contents of a particular memory storage location based upon an operating system of a virtual server associated with the particular memory storage location;

determine a runtime state of the virtual environment based on the contents of the virtual memory storage locations;

compare the runtime state of the virtual environment with a baseline state to identify a deviation from the baseline state; and perform a corrective action when the deviation meets a predetermined criteria.

\* \* \* \* \*